United States Patent [19]
Chang

[11] Patent Number: 5,689,982
[45] Date of Patent: Nov. 25, 1997

[54] GEAR SHIFTING LEVEL LOCK FOR AUTOMOBILE

[76] Inventor: Martin Mingyang Chang, 1657 Huntington Dr., #323D, Duarte, Calif. 91010

[21] Appl. No.: 619,985

[22] Filed: Mar. 21, 1996

Related U.S. Application Data

[63] Continuation-in-part of Ser. No. 437,420, May 12, 1995, abandoned.

[51] Int. Cl.$^6$ .............................. G05G 5/06; F05B 65/12; B60R 25/06
[52] U.S. Cl. ........................... 70/247; 70/202; 70/201
[58] Field of Search .............................. 70/247, 201, 202, 70/203, 211, 212, 237, 238

[56] References Cited

U.S. PATENT DOCUMENTS

| | | | |
|---|---|---|---|
| 1,043,726 | 11/1912 | Riddell | 70/203 |
| 1,126,781 | 2/1915 | Kehoe | 70/201 |
| 1,158,860 | 11/1915 | Sammons | 70/254 |
| 1,320,800 | 11/1919 | Saxton et al. | 70/201 |
| 1,330,117 | 2/1920 | Irish | 70/202 |
| 1,335,532 | 3/1920 | Sleeper | 70/203 |
| 1,388,035 | 8/1921 | Gorden | 70/201 |
| 1,402,150 | 1/1922 | DiNapoli | 70/201 |
| 1,423,691 | 7/1922 | Sokolov | 70/211 |
| 1,443,824 | 1/1923 | Pottinger | 70/211 |
| 2,046,831 | 7/1936 | Lowe | 70/451 |
| 4,347,412 | 8/1982 | Mihara et al. | 70/203 |
| 4,993,248 | 2/1991 | Nordberg | 70/202 |
| 5,473,918 | 12/1995 | Hixon | 70/247 |

*Primary Examiner*—Darnell M. Boucher

[57] ABSTRACT

An anti-theft lock for the permanent attachment to a gear shifting lever of an automobile comprising a L-shaped elbow member which can be placed into a slot for gear shifting movement of such lever and locked therein to fill-up same and therefore blocking the movement of the gear shifting lever and preventing the operation of the vehicle, a body member comprising a pair of parallel passages adapted to accommodate a portion of such gear shifting lever securely thereunto and the vertical rod portion of the L-shaped elbow regulating its movement therein, and means associated with the vertical rod of the elbow and the body member to lock the elbow for the anti-theft function and unlock and arrest same for the normal operation of the vehicle.

3 Claims, 1 Drawing Sheet

GEAR SHIFTING LEVEL LOCK FOR AUTOMOBILE

FIELD OF INVENTION

This invention is a continuation-in-part of application of patent; Ser. No. 08/437,420, filed May, 12, 1995 now abandoned, which is related to the art of automobile anti-theft device and more specifically to a device for attachment to a gear shifting lever of an floor-mount type automatic transmission of an automotive vehicle to prevent its operation thereof.

BACK GROUND OF THE INVENTION

In the above referred to Application of Patent, a novel anti-theft device for the confinement of the gear shifting lever the forward-most or "park" position is taught. According to the Application for Patent, a pivotal and retractable latching means adapted to be placed and occupied in the slot or channel of the gear shifting lever is provided. This novel device is fairly small in size, very effective in functioning and superbly convenient in use. But, because of the pivotal action of the latching means, a small dislocation at the pivotal juncture will be amplified and manifested into very large displacement at the far end of the latching member which is undesirable and therefore very high precision parts are needed for the pivotal juncture. This will increase the cost of making same and also render it to a relatively easy prey for the automobile thefts. The same pivotal operation also requires a relatively large clearance between the latching means and the end of slot which will allow violent rocking of the lever possible in theft's attempt to defeat the anti-theft device.

SUMMARY OF THE INVENTION

The present invention is a further improvement of the embodiment of the above referred to invention. The short comings of that invention as pointed out above are corrected by the replacement of the related pivotal latching structures with a longitudinal L-shaped elbow structure which is adapted to a tubular passage in the body member to slide down thereunto the slot or channel of the gear shifting lever. In addition to the improvement of the latching means, a telescopingly adjustable side arm structure and built-in arresting and regulating means are also provided to make a simple and universally adaptable anti-theft device, applicable to most of every common passenger vehicles in the market.

The first object of the present invention is therefore to provide a mechanical anti-theft device for automobile which prevents the operation of the vehicle by confinement of the gear shifting lever to the park position thereof.

The second object of the present invention is to provide a mechanical anti-theft device which is simple in structure, convenient in operation, easy in storage and economical in manufacture thereof.

A further object of this invention is to provide a mechanical anti-theft device for the automobile which is easily and conveniently attached to the vehicle being protected.

These and other objects and advantages of the invention will become apparent from the detailed descriptions taken together with the accompanying drawing.

BRIEF DESCRIPTION OF THE DRAWING

One embodiment of the invention is described by way of example in the following in connection with a vehicle having automatic transmission, with reference to the accompanying drawings in which.

DETAILED DESCRIPTIONS OF THE PREFERRED EMBODIMENT

Figure 1:
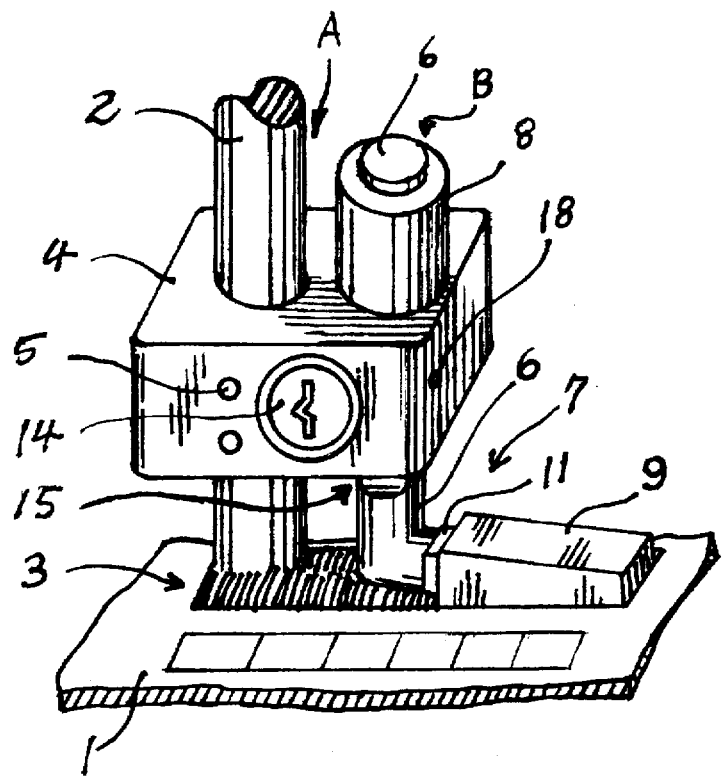
FIG. 1 shows the perspective view of an anti-theft device according to the invention, in the locked position.

Referring to the drawings wherein the demonstrations herewith are for the purpose of illustrating the preferred embodiment of the invention and not for the purpose of limiting the same, 1 designates generally a portion of the central console for an automobile and 2 a portion of the gear shifting lever for controlling the transmission mechanism. Lever 2 is operated in the usual well known manner which is shifted back and forth through a suitable slot or channel 3 provided in the central console 1. The anti-theft device of this invention comprises a body member 4 adapted to accommodate therein the gear shifting lever 2 in a first vertical passage A and is placed thereupon either by sliding the same over the free end of the lever 2 or through an opening of a detachable hinge or saddle type of structure equipped to the side of body member 4 not shown in the present figures. Body member 4 is made fast upon shifting lever 2 through the medium of rivets 5 or other permanent fastening means which are engaged transversely in one side of body 4 and in the shifting lever 2 so that body member 4 will be made fast thereon to avoid the easy removal from the same.

Provision in body 2 is also made to accommodate, by means of a second vertical passage B, in parallel to passage A, the vertical rod 6 of a L-shaped latching member or elbow 7, the same being further supported by a collar 8 extended from the top of body member 4. The horizontal portion of elbow 7 is composed of a telescopingly extensible rectangular block 9 threaded thereto, which is then fasten further by a nut 11. The overall configuration of elbow 7 is such that it will enter and submerge the greater portion of its side arm structures block 9 through nut 11 into slot 3 when rod 6 is lowered to the locking position as shown in FIG. 1. In other words, the angle of the elbow 7 will be at least as large as the angle between gear shifting lever 2 and the floor of central console 1 and the horizontal span of elbow 7 shall be such as to reach to the very end of slot 3 so that to freeze lever 2 to the "Park" position. The threaded block 9 will allow the adjustment in length to meet the latter requirement.

A first semi circular notch 12 is provided on rod 6 at the designated position so that when block 9 is placed in slot 3, that is, in the locking position, notch 12 will meet and receive at least a portion of the arcuate outer surface of tumbler 13 of a locking member 14 also accommodated in body member 4. At an appropriate distance down the first notch 12, there is provided a second semi circular notch 15 at 90 degrees angle to notch 12.

This distance defines the amount of vertical displacement of rod 6 in passage B. A third notch of identical nature but to the opposite side of notch 15 is also provided which is not shown in these figures. These are designated to arrest the latching elbow 7 in the released and swung away position to clear the way for the gear shifting movement of lever 2, when the anti-theft device is put to the unlocking condition.

The locking member 14 is mounted transversely between the first passage A and the second passage B having a portion of its tumbler 13 intersecting at least a portion of the circumference of passage B so that the arcuate outer surface of tumbler 13 may extrude thereunto and control the movement of rod 6 and henceforth the latching elbow 7 for the locking and unlocking functions of the anti-theft device. The latter or unlocking function is provided through a flat or recessed portion 16 cut-off from tumbler 13 which clears the way for the movement of rod 6 in passage B when locking member 14 is switched 180 degrees from the locking position.

A reversed T-shaped groove 17 is engraved onto rod 6 for regulating the movements of elbow 7, in coordination with a locating pin 18. The length of the vertical portion of groove 17 is made to match the distance between notch 13 and notch 15. The length of the horizontal portion of groove 17 spans to nearly one half of the circumference of rod 6. Groove 17 is so positioned such that, when rod 6 is pushed down along the vertical portion of groove 19 until pin 16 reaches tip 21, notch 12 will come to face tumbler 13. And when rod 6 is moved up along the vertical portion of groove 19 so that pin 16 will enter into the horizontal portion of groove 21, elbow 7 can then be swung side ways either to the left or to the right while, at the means time, notch 15 is raised to the same level of tumbler 13. Thus, notch 15 will come to face tumbler 13 when elbow 7 is moved to the far left along the horizontal groove 21 and vise versa. Either way, elbow 7 may be arrested by tumbler 13 at any one of these positions by turning locking member 14 for 180 degrees from the unlocking condition, clearing the way for the movement of gear shifting lever 2 in slot 3.

Figure 2:
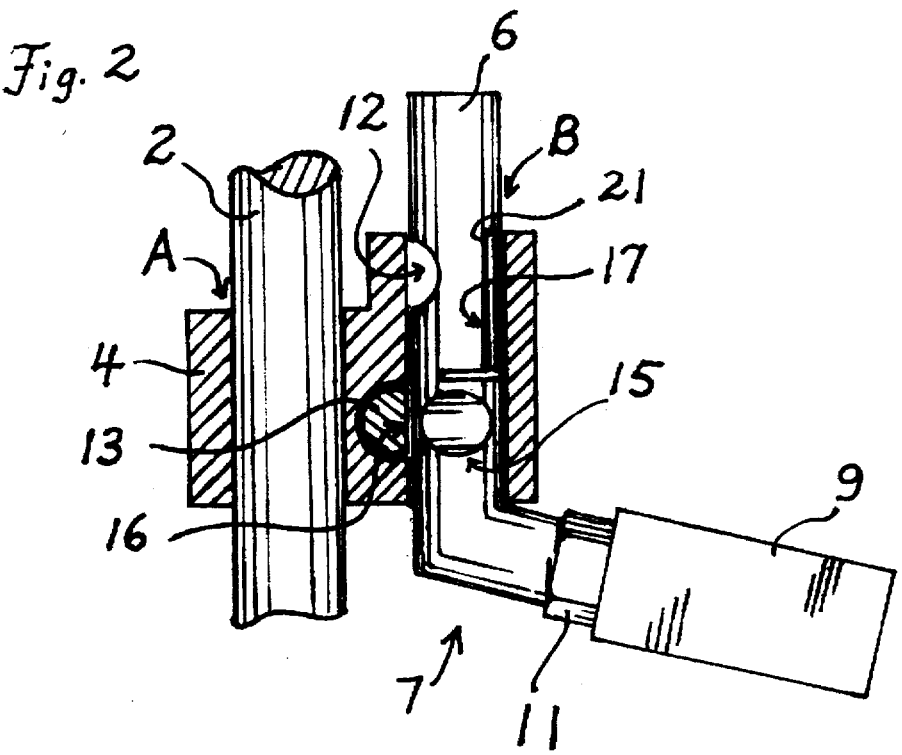
FIG. 2 is a vertical sectional view of the anti-theft device through the center line of the gear shifting lever and the slot or channel of the central console showing the L-shaped latching member of the device in the released and raised position thereof.

In operation, when flat 16 of tumbler is oriented toward passage B as shown in FIG. 2, rod 6 is free to move either up and down in passage B if pin 18 is in the vertical portion of groove 17 or to swing from side to side if pin 18 is in the horizontal portion of groove 21. In this unlocking condition, latching elbow 7 is lowered to enter slot 3 until it reaches the locking position whereby tip 21 engages pin 18. The anti-theft device can then be locked by turning the key of locking means 14 for 180 degrees from the unlocking condition. To unlock the anti-theft device, the reversed process will be taken. That is, the key is turned 180 degrees from the locking position to orient the flat toward passage B. Elbow 7 is raised from slot 3 until it is stopped for the entrance of pin 18 into the horizontal portion of groove 17 and then swung to the side until it is stopped for pin 18 reaching either end of the horizontal portion of groove 21. The elbow is finally arrested and left in this position by turning the locking member 14 for another 180 degrees thereof.

Accordingly, the present invention provides an anti-theft device which is compact in size and exceptionally quick and simple to use, when compared to other mechanical anti-theft accessories such as the club ™. It will be further appreciated that the present invention because of its configuration and location of application exposes the least amount of moving parts and therefore presents a most formidable obstacle to a potential theft.

More importantly, the permanent attachment of the present invention provides an anti-theft device which does not need any extra storage space anywhere else in the vehicle. And the device itself can not be lost or stolen from the automobile of its protection. Further more, the telescoping arrangement of the elbow structure makes the present device compatible for use with almost all sizes of central console slots for the passenger automobiles.

The invention has been described with reference to the preferred embodiment. It will be appreciated that modifications could be made without deviating from the present invention. For example, as an alternative structure, the second passage adapted for the vertical rod of the elbow may be placed right next to the first passage. The locking means and the associated tumbler will then be provided to the other side of the second passage, away from the first instead of in between them. In this alteration, the distance between the vertical rod in the locking position and the corresponding portion of the gear shifting lever is reduced to a minimum which eliminates the chance for the insertion of an external tool such as a crossbar thereto and prying of the anti-theft device. On the other hand, a tongue like structure may be added between the gear shifting lever and the exposed portion of the vertical rod to prevent the insertion of such crossbar. These and other modifications and alterations will occur to others from the teachings of this invention. It is intended that all such modifications and alterations be included insofar as they come within the scope of the patent as claimed or the equivalence thereof.

Having thus described the invention, I claim:

1. An anti-theft device for the gearshift lever of an automotive vehicle equipped with an automatic transmission, the gearshift lever extending essentially vertically through a slot opening on the central console of the vehicle, the anti-theft device comprising a body member adapted to surround and firmly engage a lower portion of the gearshift lever, a L-shaped latching member adapted to be engaged into and occupying said slot opening and a locking member adapted to locking and unlocking the movement of said latching member thereof, said body member being provided with a first vertical passage adapted to be securely attached to said lever, a second vertical passage adapted to slidingly receive the vertical rod portion of said latching member, a collar structure extending upwardly from said second passage and a locating pin extending inwardly into said second passage, said latching member being provided with a vertical rod and an essentially horizontal and telescopingly adjustable side arm thereof, said vertical rod having an upper arcuate notch located to the opposite side of said arm, a lower arcuate notch at right angle to said upper notch and an inverted T-shaped pin-receiving groove to the opposite side of said upper notch, said side arm having a threaded rectangular block matching in shape to said slot opening and a pairing nut with which said side arm can be adjusted to occupy essentially the entire slot opening therein, the orientation of said notches, groove, pin and locking member being such that said upper notch will engage a tumbler mechanism of said locking member and said pin will reach to the top of said inverted T groove when said side arm is lowered into said slot opening while the gearshift lever is placed at the parking position for the locking function of said anti-theft device and said lower notch will engage said tumbler mechanism of said locking member and said pin will reach to the end of the horizontal branch of said inverted T groove whenever said side arm is raised completely from said slot opening and turned away at right angle to the direction of said opening for the arresting of said latching member in the unlocking function of said device thereof, said tumbler mechanism being partially flat and intersecting at least a portion of said second passage for the locking and unlocking of said latching member in said respective functions thereof, and means for attaching and securing said body member to said gearshift lever.

2. The anti-theft device as claimed in claim 1 wherein said locking member is composed of a key operated locking mechanism.

3. The anti-theft device as claimed in claim 1 whereby an additional arcuate notch identical to said lower arcuate notch is provided at a position offset from said lower notch on said vertical rod.

* * * * *